(12) United States Patent
Wang et al.

(10) Patent No.: US 11,510,158 B2
(45) Date of Patent: Nov. 22, 2022

(54) TRANSMISSION METHOD, TERMINAL DEVICE, AND NETWORK DEVICE

(71) Applicant: HUAWEI TECHNOLOGIES CO., LTD., Guangdong (CN)

(72) Inventors: Xu Wang, Shanghai (CN); Renting Zhang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 153 days.

(21) Appl. No.: 16/844,852

(22) Filed: Apr. 9, 2020

(65) Prior Publication Data
US 2020/0236642 A1   Jul. 23, 2020

Related U.S. Application Data

(63) Continuation of application No. PCT/CN2017/106134, filed on Oct. 13, 2017.

(51) Int. Cl.
*H04W 56/00* (2009.01)
*H04W 72/04* (2009.01)

(52) U.S. Cl.
CPC ..... *H04W 56/0005* (2013.01); *H04W 72/042* (2013.01); *H04W 72/0453* (2013.01)

(58) Field of Classification Search
CPC ....... H04W 72/08; H04W 8/02; H04W 24/02; H04W 48/20; H04W 72/042;
(Continued)

(56) References Cited

U.S. PATENT DOCUMENTS

2012/0122392 A1    5/2012  Morioka et al.
2015/0257163 A1*   9/2015  Dalsgaard ............... H04W 8/02
                                                              455/452.2
(Continued)

FOREIGN PATENT DOCUMENTS

CN    101583081 A    11/2009
CN    103368763 A    10/2013
(Continued)

OTHER PUBLICATIONS

3GPP TS 36.133 V15.0.0 (Sep. 2017), 3rd Generation Partnership Project; Technical Specification Group Radio Access Network; Evolved Universal Terrestrial Radio Access (E-UTRA); Requirements for support of radio resource management (Release 15), Sep. 2017, 2663 pages.
(Continued)

*Primary Examiner* — Dady Chery
(74) *Attorney, Agent, or Firm* — Fish & Richardson P.C.

(57) ABSTRACT

This application provides a transmission method, a terminal device, and a network device. The transmission method includes: sending, by a terminal device, a second message to a network device after receiving a first message that is sent by the network device and that is used to instruct to activate a secondary carrier cell, where the second message is used to indicate a preset time; and receiving, by the terminal device, a third message that is sent by the network device based on the preset time, where the third message is used to instruct to trigger resynchronization of the secondary carrier cell. The transmission method in this application helps quickly reduce a time for triggering resynchronization of an uplink secondary carrier cell, and improve an uplink throughput.

12 Claims, 3 Drawing Sheets

(58) Field of Classification Search
CPC ............. H04W 88/08; H04W 56/0005; H04W 72/0453; H04L 5/001; H04L 5/0098; H04L 5/0023; H04L 5/0085; H04L 27/26
See application file for complete search history.

(56) References Cited

U.S. PATENT DOCUMENTS

| | | | |
|---|---|---|---|
| 2016/0302204 A1* | 10/2016 | Li | ..................... H04W 56/0005 |
| 2017/0013615 A1* | 1/2017 | Suzuki | ..................... H04L 1/08 |

FOREIGN PATENT DOCUMENTS

| | | |
|---|---|---|
| CN | 105592560 A | 5/2016 |
| CN | 106789800 A | 5/2017 |
| CN | 107196750 A | 9/2017 |
| CN | 107241780 A | 10/2017 |
| EP | 3113561 A1 | 1/2017 |
| EP | 3370380 A1 | 9/2018 |
| EP | 3624381 A1 | 3/2020 |
| EP | 2921018 B1 | 9/2020 |

OTHER PUBLICATIONS

PCT International Search Report and Written Opinion issued in International Application No. PCT/CN2017/106134 dated Jun. 27, 2018, 13 pages (with English translation).

Extended European Search Report issued in European Application No. 17928419.5 dated Oct. 1, 2020, 13 pages.

Huawei, HiSilicon, "Delay reduction for SCell Activation," 3GPP TSG-RAN WG2 Meeting #99, R2-1708550, Berlin, German, Aug. 21-25, 2017, 3 pages.

Qualcomm Incorporated, "Fast SCell activation for enhanced CA utilization," 3GPP TSG-RAN2 Meeting #99, R2-1707787, Berlin, Germany, Aug. 21-25, 2017, 5 pages.

Mediatek, "Discusion on Rel-11 TA timer," 3GPP TSG-RAN WG2#75, R2-114188, Athens, Greece, Aug. 22-26, 2011, 4 pages.

Nokia Networks, "PUCCH Scell activation delay requirements," 3GPP TSG-RAN WG4#76bis, R4-156245, Sophia Antipolis, France, Oct. 12-16, 2015, 7 pages.

Office Action in Japanese Application No. 2020520825, dated May 31, 2021, 6 pages.

EPO Communication pursuant to Article 94(3) EPC issued in European Application No. 17928419.5 dated Feb. 21, 2022, 10 pages.

* cited by examiner

Network device    Terminal device

TRANSMISSION METHOD, TERMINAL DEVICE, AND NETWORK DEVICE

CROSS-REFERENCE TO RELATED APPLICATIONS

This application is a continuation of International Patent Application No. PCT/CN2017/106134, filed on Oct. 13, 2017, the disclosure of which is hereby incorporated by reference in its entirety.

TECHNICAL FIELD

This application relates to the communications field, and more specifically, to a transmission method, a terminal device, and a network device.

BACKGROUND

As the carrier aggregation (Carrier Aggregation. CA) industry becomes increasingly mature, there are increasingly more requirements for uplink CA. To improve uplink CA demodulation performance in non-co-coverage scenarios, multiple timing advances (MTA) are introduced in a protocol. In addition, MTA-based uplink 2 carrier aggregation has been put into commercial use, for example, South Korea LG U+ has been successfully put into commercial use. A plurality of operators are actively testing and preparing, and are ready for commercial use. According to a protocol specification, after receiving a secondary carrier activation message, a terminal device supports a maximum of 34 ms activation delay.

For a user in an uplink 2 carrier cell (Carrier Cell, CC), there is a relatively long hysteresis waiting time in an uplink secondary carrier cell (Secondary Carrier Cell, SCC), which causes a performance loss, and a terminal with a relatively strong capability does not need to wait for such a long time.

SUMMARY

This application provides a transmission method, a terminal device, and a network device, to flexibly adjust a time for triggering resynchronization of an uplink secondary carrier cell.

According to a first aspect, a transmission method is provided. The method includes: sending, by a terminal device, a second message to a network device after receiving a first message that is sent by the network device and that is used to instruct to activate a secondary carrier cell, where the second message is used to indicate a preset time; and receiving, by the terminal device, a third message that is sent by the network device based on the preset time, where the third message is used to instruct to trigger resynchronization of the secondary carrier cell.

In some possible implementations, the third message is a PDCCH order.

According to the transmission method in this embodiment of this application, a time for triggering resynchronization of an uplink secondary carrier cell can be flexibly adjusted.

With reference to the first aspect, in some possible implementations of the first aspect, the method further includes: determining, by the terminal device, the preset time based on a preparation time for demodulating a physical downlink control channel PDCCH by the terminal device.

In some possible implementations, the terminal device determines the preset time based on an antenna status of the terminal device.

With reference to the first aspect, in some possible implementations of the first aspect, the preset time is a time difference between a moment at which the terminal device receives the first message and a moment at which the terminal device receives the third message.

With reference to the first aspect, in some possible implementations of the first aspect, the second message is a media access control layer control element MCE.

With reference to the first aspect, in some possible implementations of the first aspect, duration of the preset time is less than or equal to 30 ms.

The transmission method in this embodiment of this application helps quickly reduce a time for triggering resynchronization of an uplink secondary carrier cell, and improve an uplink throughput.

According to a second aspect, a transmission method is provided. The method includes: receiving, by a network device after sending a first message used to instruct to activate a secondary carrier cell, a second message sent by a terminal device, where the second message is used to indicate a preset time; and sending, by the network device, a third message to the terminal device based on the preset time, where the third message is used to instruct to trigger resynchronization of the secondary carrier cell.

In some possible implementations, the third message is a PDCCH order.

According to the transmission method in this embodiment of this application, a time for triggering resynchronization of an uplink secondary carrier cell can be flexibly adjusted.

With reference to the second aspect, in some possible implementations of the second aspect, the preset time is a time difference between a moment at which the network device sends the first message and a moment at which the network device sends the third message.

With reference to the second aspect, in some possible implementations of the second aspect, the second message is a media access control layer control element MCE.

With reference to the second aspect, in some possible implementations of the second aspect, duration of the preset time is less than or equal to 30 ms.

The transmission method in this embodiment of this application helps quickly reduce a time for triggering resynchronization of an uplink secondary carrier cell, and improve an uplink throughput.

According to a third aspect, a terminal device is provided. The terminal device includes: a transceiver module, configured to send a second message to a network device after receiving a first message that is sent by the network device and that is used to instruct to activate a secondary carrier cell, where the second message is used to indicate a preset time; and a processing module, configured to receive a third message that is sent by the network device based on the preset time, where the third message is used to instruct to trigger resynchronization of the secondary carrier cell.

With reference to the third aspect, in some possible implementations of the third aspect, the processing module is further configured to determine the preset time based on a preparation time for demodulating a physical downlink control channel PDCCH by the terminal device.

With reference to the third aspect, in some possible implementations of the third aspect, the preset time is a time difference between a moment at which the transceiver module receives the first message and a moment at which the transceiver module receives the third message.

With reference to the third aspect, in some possible implementations of the third aspect, the second message is a media access control layer control element MCE.

With reference to the third aspect, in some possible implementations of the third aspect, duration of the preset time is less than or equal to 30 ms.

The terminal device in this embodiment of this application may notify the network device of the preset time in advance. This helps quickly reduce a time for triggering resynchronization of an uplink secondary carrier cell, and improve an uplink throughput.

According to a fourth aspect, a network device is provided. The network device includes: a transceiver module, configured to: after sending a first message used to instruct to activate a secondary carrier cell, receive a second message sent by a terminal device, where the second message is used to indicate a preset time; and a processing module, configured to send a third message to the terminal device based on the preset time, where the third message is used to instruct to trigger resynchronization of the secondary carrier cell.

With reference to the fourth aspect, in some possible implementations of the fourth aspect, the preset time is a time difference between a moment at which the transceiver module sends the first message and a moment at which the transceiver module sends the third message.

With reference to the fourth aspect, in some possible implementations of the fourth aspect, the second message is a media access control layer control element MCE.

With reference to the fourth aspect, in some possible implementations of the fourth aspect, duration of the preset time is less than or equal to 30 ms. According to the network device in this embodiment of this application, the terminal device may notify the network device of the preset time in advance. This helps quickly reduce a time for triggering resynchronization of an uplink secondary carrier cell, and improve an uplink throughput.

According to a fifth aspect, a terminal device is provided. The terminal device includes a memory and a processor. The memory is configured to store an instruction, and the processor is configured to invoke the instruction in the memory, to perform operations in the method in the first aspect or any one of the possible implementations of the first aspect.

According to a sixth aspect, a network device is provided. The network device includes a memory and a processor. The memory is configured to store an instruction, and the processor is configured to invoke the instruction in the memory, to perform operations in the method in the second aspect or any one of the possible implementations of the second aspect.

According to a seventh aspect, a communications system is provided. The communications system includes a terminal device and/or a network device. The terminal device is the terminal device in the third aspect, the fifth aspect, or any one of the possible implementations of the third aspect and the fifth aspect. The network device is the network device in the fourth aspect, the sixth aspect, or any one of the possible implementations of the fourth aspect and the sixth aspect.

According to an eighth aspect, a computer-readable storage medium is provided. The computer-readable storage medium stores an instruction. When the instruction is run on a computer, the computer is enabled to perform the methods according to the foregoing aspects.

According to a ninth aspect, a system chip is provided. The system chip includes an input/output interface, at least one processor, at least one memory, and a bus. The at least one memory is configured to store an instruction, and the at least one processor is configured to invoke the instruction in the at least one memory, to perform operations of the methods in the foregoing aspects.

DESCRIPTION OF EMBODIMENTS

Figure 1:
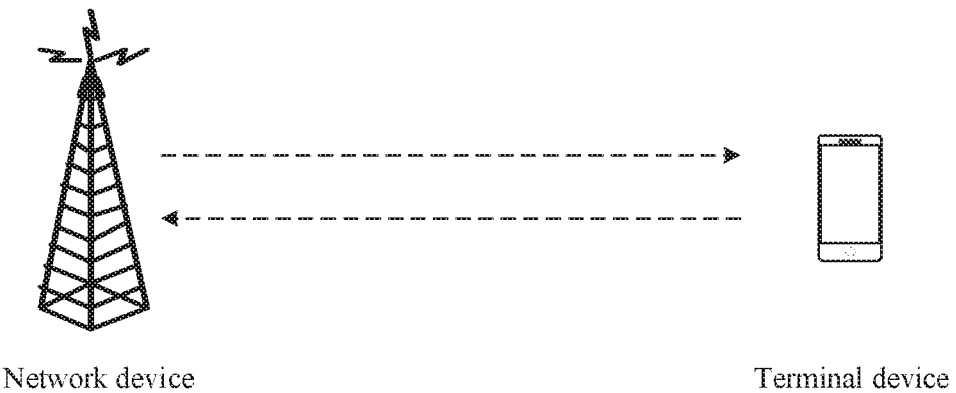
FIG. 1 is an application scenario of a technical solution according to an embodiment of this application.

The following describes technical solutions of this application with reference to accompanying drawings.

The technical solutions of the embodiments of this application may be applied to various communications systems, such as: a global system for mobile communications (Global System for Mobile Communications. GSM) system, a code division multiple access (Code Division Multiple Access, CDMA) system, a wideband code division multiple access (Wideband Code Division Multiple Access, WCDMA) system, a general packet radio service (General Packet Radio Service, GPRS), a long term evolution (Long Term Evolution, LTE) system, an LTE frequency division duplex (Frequency Division Duplex, FDD) system, an LTE time division duplex (Time Division Duplex, TDD) system, a universal mobile telecommunications system (Universal Mobile Telecommunications System, UMTS), a worldwide interoperability for microwave access (Worldwide Interoperability for Microwave Access, WiMAX) communications system, a future 5th generation (5th Generation, 5G) system, or a new radio (New Radio, NR) system.

A terminal device in the embodiments of this application may be referred to as user equipment, an access terminal, a subscriber unit, a subscriber station, a mobile station, a mobile console, a remote station, a remote terminal, a mobile device, a user terminal, a terminal, a wireless communications device, a user agent, a user apparatus, or the like. The terminal device may also be a cellular phone, a cordless phone, a session initiation protocol (Session Initiation Protocol, SIP) phone, a wireless local loop (Wireless Local Loop, WLL) station, a personal digital assistant (Personal Digital Assistant, PDA), a handheld device having a wireless communication function, a computing device, another processing device connected to a wireless modem, a vehicle-mounted device, a wearable device, a terminal device in a future 5G network, a terminal device in a future evolved public land mobile network (Public Land Mobile Network, PLMN), or the like. This is not limited in the embodiments of this application.

A network device in the embodiments of this application may be a device configured to communicate with the terminal device. The network device may be a base transceiver station (Base Transceiver Station, BTS) in the global system for mobile communications (Global System of Mobile communication, GSM) or the code division multiple access (Code Division Multiple Access, CDMA) system, or may be a NodeB (NodeB, NB) in the wideband code division multiple access (Wideband Code Division Multiple Access, WCDMA) system, or may be an evolved NodeB (evolved NodeB, eNB or eNodeB) in the LTE system, or may be a radio controller in a cloud radio access network (Cloud Radio Access Network, CRAN) scenario. Alternatively, the network device may be a relay node, an access point, a vehicle-mounted device, a wearable device, a network device in the future 5G network, a network device in the future evolved PLMN network, or the like. This is not limited in the embodiments of this application.

FIG. 1 is an application scenario of a technical solution according to an embodiment of this application. As shown in FIG. 1, after receiving a message for activating a secondary carrier cell, the terminal device may report a capability of the terminal device to the network device, for example, a preparation time for demodulating a physical downlink control channel (Physical Downlink Control Channel, PDCCH) by the terminal device. After learning of the capability of the terminal device, the network device sends, based on the capability of the terminal device, a message for triggering resynchronization of the secondary carrier cell to the terminal device.

Figure 2:
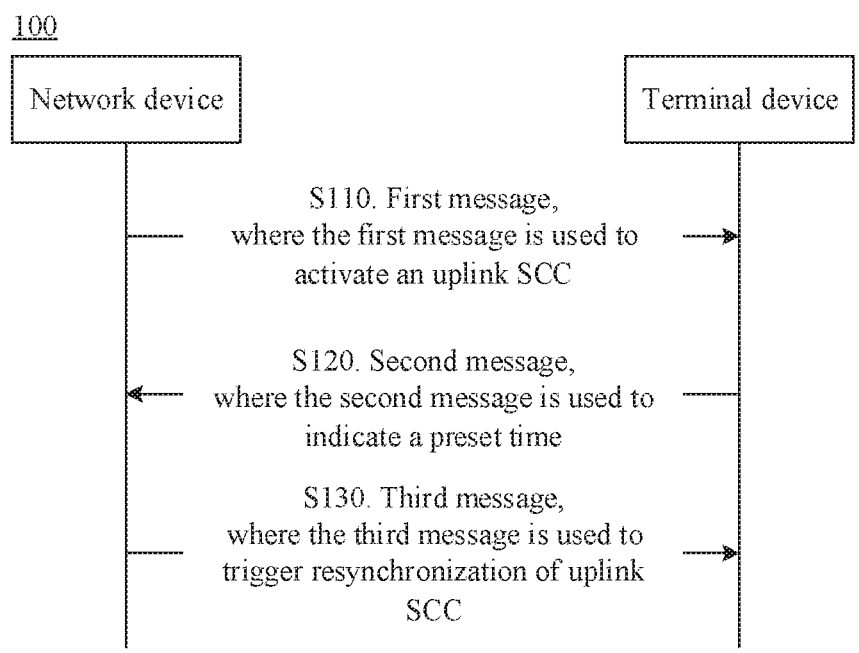
FIG. 2 is a schematic flowchart of a transmission method according to an embodiment of this application.

FIG. 2 is a schematic flowchart of a transmission method 100 according to an embodiment of this application. As shown in FIG. 2, the method 100 includes the following steps.

S110. A terminal device receives a first message sent by a network device. The network device sends the first message to the terminal device, where the first message is used to instruct the terminal device to activate a secondary carrier cell.

S120. After receiving the first message, the terminal device sends a second message to the network device. The network device receives the second message sent by the terminal device, where the second message is used to indicate a preset time.

S130. The network device sends a third message to the terminal device based on the preset time, where the third message is used to instruct the terminal device to trigger resynchronization of the secondary carrier cell.

Specifically, when an MTA is enabled, the network device sends the first message to the terminal device, and the first message is used to instruct the terminal device to activate the secondary carrier cell. After receiving the first message, the terminal device sends the second message to the network device, to report a capability, that is, the preset time, of the terminal device. After receiving the second message, the network device sends, based on the preset time that is of the terminal device and that is carried in the second message, the third message to the terminal device, and the third message is used to instruct the terminal device to trigger resynchronization of the secondary carrier cell.

Optionally, the preset time is less than or equal to 30 ms. It should be understood that the preset time may be a time period, or may be a moment. This is not limited in this application.

In the prior art, when an MTA is enabled, resynchronization needs to be triggered after an uplink SCC is activated, to maintain uplink synchronization of the SCC. To support a protocol, a current implementation is that a PDCCH order (PDCCH order) is sent after a delay of 30 ms after activation, to trigger SCC resynchronization. However, a terminal device with a relatively strong capability does not need to wait for such a long time, and an excessively long waiting time causes a performance loss.

According to the transmission method in this embodiment of this application, a time for triggering resynchronization of an uplink secondary carrier cell can be flexibly adjusted.

Optionally, the method further includes:

determining, by the terminal device, the preset time based on a preparation time for demodulating a physical downlink control channel PDCCH by the terminal device.

Specifically, after receiving the first message, the terminal device activates the uplink SCC, and the terminal device determines the preset time based on the preparation time for demodulating the physical downlink control channel PDCCH by the terminal device.

It should be understood that the terminal device may determine the preset time based on the preparation time for demodulating the physical downlink control channel PDCCH by the terminal device, or may determine the preset time based on an antenna status of the terminal device, or may determine the preset time based on another condition that is related to the capability of the terminal device. This application is not limited thereto.

Optionally, the preset time is a time difference between a moment at which the terminal device receives the first message and a moment at which the terminal device receives the third message.

Optionally, the preset time is $\Delta t$, and the sending, by the network device, a third message to the terminal device based on the preset time includes:

sending, by the network device, the third message to the terminal device after sending the first message and waiting for $\Delta t$.

Specifically, the terminal device sends the second message to the network device, and the second message carries the preset time $\Delta t$. After sending the first message, the network device waits for $\Delta t$, and sends the third message to the terminal device.

For example, the network device sends the first message at a moment $t_1$, the terminal device receives the first message at the moment $t_1$, the second message sent by the terminal device to the network device carries the preset time $\Delta t$, the network device sends the third message to the terminal device at a moment $t_2$, and the terminal device receives the third message at the moment $t_2$, where $$\Delta t = t_2 - t_1$$

The network device determines the preset time in the second message as duration from sending the first message to sending the third message.

It should be understood that, in the technical solutions in this embodiment of this application, a moment at which the network device sends the first message to the terminal device, a moment at which the terminal device sends the second message to the network device, and a moment at which the network device receives the second message are considered as a same moment, and a delay from sending the first message by the network device to receiving the second message by the network device is not considered. In an actual case, there is a delay from sending the first message by the network device to receiving the second message by the network device, but the delay is relatively short, for example, about 1 ms, and can be ignored.

It should be further understood that, after the network device receives the second message, based on the preset time $\Delta t$ carried in the second message, the network device may send the third message to the terminal device after sending the first message and waiting for $\Delta t + \Delta t_1$, where $$\Delta t + \Delta t_1 = t_2 - t_1$$

For example, considering that there is a delay between sending the first message by the network device and receiving the second message by the network device, $\Delta t_1$ is determined as 1 ms.

For another example, to further ensure that the terminal device is ready to demodulate the PDCCH, the $\Delta t_1$ is determined as 5 ms.

Optionally, the preset time $\Delta t$ is less than or equal to 30 ms.

Optionally, the second message is a media access control layer control element MCE, the MCE is used to indicate the preset time, and the MCE may be an MCE predefined by the network device and the terminal device.

For example, after the network device configures an uplink secondary carrier cell, the terminal sends, based on the capability of the terminal device, an uplink media access control control element (MAC Control Element, MCE) by using a logical channel identifier (Logical Channel Identify, LCID) resource negotiated in advance by the network device and the terminal device, to notify the network device of the preset time.

It should be understood that a field in the MCE may include information about the preset time, the MCE is an MCE used by the network device and the terminal device through negotiation, and the field in the MCE is also agreed upon by the network device and the terminal device through negotiation.

According to the transmission method in this embodiment of this application, the terminal device notifies the network device of the preset time in advance, to help quickly reduce a time for triggering resynchronization of the uplink secondary carrier cell, and improve an uplink throughput and competitiveness of uplink carrier aggregation.

The foregoing describes in detail the transmission method according to the embodiments of this application with reference to FIG. 2. The following describes in detail a terminal device and a network device according to the embodiments of this application with reference to FIG. 3 to FIG. 6.

Figure 3:
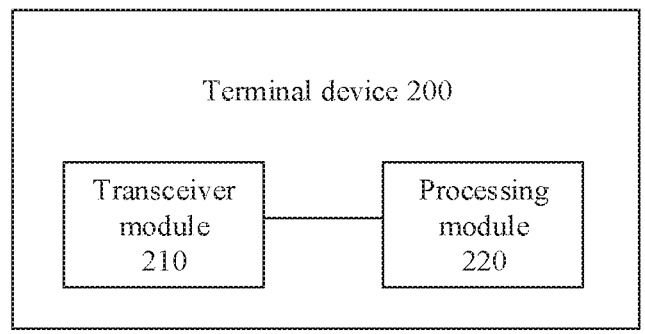
FIG. 3 is a schematic block diagram of a terminal device according to an embodiment of this application.

FIG. 3 is a schematic block diagram of a terminal device 200 according to an embodiment of this application. As shown in FIG. 3, the terminal device 200 includes:

a transceiver module 210, configured to send a second message to a network device after receiving a first message that is sent by the network device and that is used to instruct to activate a secondary carrier cell, where the second message is used to indicate a preset time; and a processing module 220, configured to receive a third message that is sent by the network device based on the preset time, where the third message is used to instruct to trigger resynchronization of the secondary carrier cell.

Optionally, the processing module 220 is further configured to determine the preset time based on a preparation time for demodulating a physical downlink control channel PDCCH by the terminal device.

Optionally, the preset time is a time difference between a moment at which the transceiver module receives the first message and a moment at which the transceiver module receives the third message.

Optionally, the second message is a media access control layer control element MCE.

Optionally, duration of the preset time is less than or equal to 30 ms. The terminal device in this embodiment of this application may notify the network device of the preset time in advance. This helps quickly reduce a time for triggering resynchronization of an uplink secondary carrier cell, and improve an uplink throughput.

Figure 4:
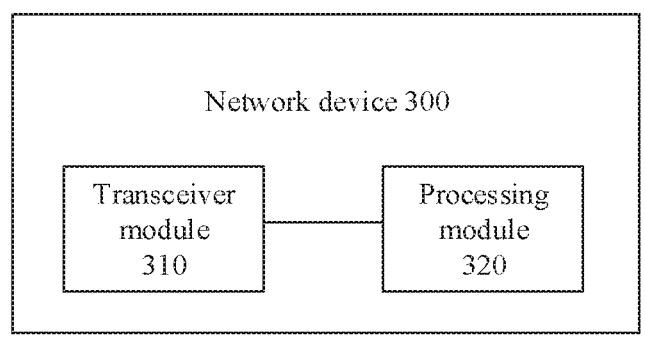
FIG. 4 is a schematic block diagram of a network device according to an embodiment of this application.

FIG. 4 is a schematic block diagram of a network device 300 according to an embodiment of this application. As shown in FIG. 4, the network device 300 includes:

a transceiver module 310, configured to: after sending a first message used to instruct to activate a secondary carrier cell, receive a second message sent by a terminal device, where the second message is used to indicate a preset time; and a processing module 320, configured to send a third message to the terminal device based on the preset time, where the third message is used to instruct to trigger resynchronization of the secondary carrier cell.

Optionally, the preset time is a time difference between a moment at which the transceiver module sends the first message and a moment at which the transceiver module sends the third message.

Optionally, the second message is a media access control layer control element MCE.

Optionally, duration of the preset time is less than or equal to 30 ms.

According to the network device in this embodiment of this application, the terminal device may notify the network device of the preset time in advance. This helps quickly reduce a time for triggering resynchronization of an uplink secondary carrier cell, and improve an uplink throughput.

Figure 5:
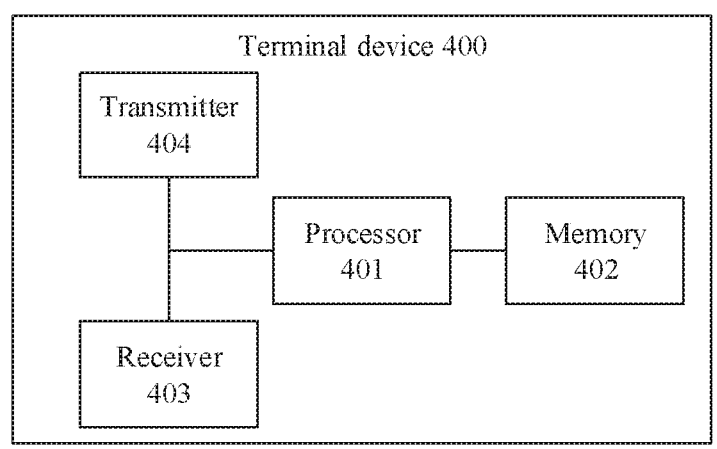
FIG. 5 is another schematic block diagram of a terminal device according to an embodiment of this application.

FIG. 5 is a schematic structural diagram of a terminal device 400 according to an embodiment of this application. As shown in FIG. 5, the terminal device 400 includes a processor 401, a memory 402, a receiver 403, and a transmitter 404. A communication connection is performed between these components. The memory 402 is configured to store an instruction, and the processor 401 is configured to execute the instruction stored in the memory 402, control the receiver 403 to receive information, and control the transmitter 404 to send information.

The processor 401 is configured to execute the instruction stored in the memory 402, the processor 401 may be configured to perform an operation and/or a function corresponding to the processing module 220 in the terminal device 200. The receiver 403 and the transmitter 404 may be configured to perform an operation and/or a function corresponding to the transceiver module 210 in the terminal device 200. For brevity, details are not described herein again.

Figure 6:
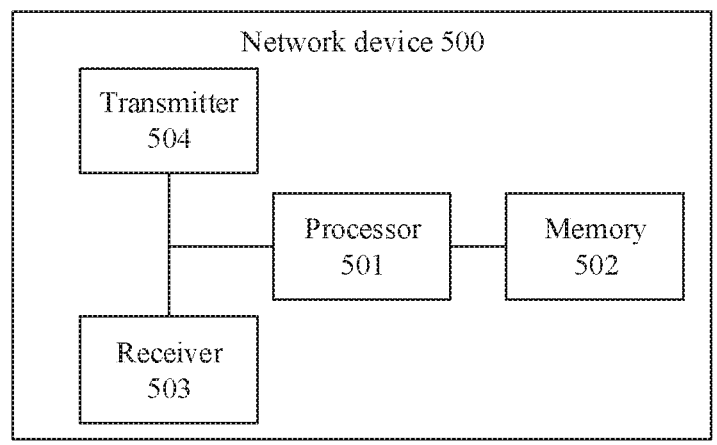
FIG. 6 is another schematic block diagram of a network device according to an embodiment of this application.

FIG. 6 is a schematic structural diagram of a network device 500 according to an embodiment of this application. As shown in FIG. 6, the network device 500 includes a processor 501, a memory 502, a receiver 503, and a transmitter 504. A communication connection is performed between these components. The memory 502 is configured to store an instruction, and the processor 501 is configured to execute the instruction stored in the memory 502, control the receiver 503 to receive information, and control the transmitter 504 to send information.

The processor 501 is configured to execute the instruction stored in the memory 502, the processor 501 may be configured to perform an operation and/or a function corresponding to the processing module 320 in the network device 300. The receiver 503 and the transmitter 504 may be configured to perform an operation and/or a function corresponding to the transceiver module 310 in the network device 300. For brevity, details are not described herein again.

Figure 7:
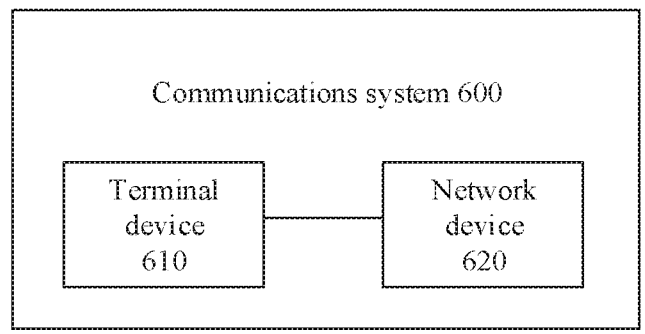
FIG. 7 is a schematic block diagram of a communications system according to an embodiment of this application.

FIG. 7 is a schematic block diagram of a communications system 600 according to an embodiment of this application. As shown in FIG. 7, the communications system 600 includes a terminal device 610 and/or a network device 620.

The terminal device 610 may be the terminal device 200 or the terminal device 400, and the network device 620 may be the network device 300 or the network device 500.

An embodiment of this application further provides a system chip. The system chip includes an input/output interface, at least one processor, at least one memory, and a bus. The at least one memory is configured to store an instruction, and the at least one processor is configured to invoke the instruction in the at least one memory, to perform operations of the methods in the foregoing aspects.

In the embodiments of this application, it should be noted that the method embodiments in the embodiments of this application may be applied to a processor, or implemented by a processor. The processor may be an integrated circuit chip and has a signal processing capability. In an implementation process, steps in the foregoing method embodiments can be implemented by using a hardware integrated logic circuit in the processor, or by using instructions in a form of software. The processor may be a general-purpose processor, a digital signal processor (Digital Signal Processor, DSP), an application specific integrated circuit (Application Specific Integrated Circuit, ASIC), a field programmable gate array (Field Programmable Gate Array, FPGA) or another programmable logic device, a discrete gate or transistor logic device, or a discrete hardware component. It may implement or perform the methods, the steps, and logical block diagrams that are disclosed in the embodiments of this application. The general-purpose processor may be a microprocessor, or the processor may be any conventional processor or the like. Steps of the methods disclosed with reference to the embodiments of this application may be directly executed and accomplished by using a hardware decoding processor, or may be executed and accomplished by using a combination of hardware and software modules in the decoding processor. A software module may be located in a mature storage medium in the art, such as a random access memory, a flash memory, a read-only memory, a programmable read-only memory, an electrically erasable programmable memory, a register, or the like. The storage medium is located in the memory, and the processor reads information in the memory and completes the steps in the foregoing methods in combination with hardware of the processor.

It may be understood that the memory in the embodiments of this application may be a volatile memory or a non-volatile memory, or may include a volatile memory and a non-volatile memory. The non-volatile memory may be a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (Random Access Memory, RAM), used as an external cache. By way of example but not limitative description, many forms of RAMs may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchlink dynamic random access memory (Synchlink DRAM, SLDRAM), and a direct rambus random access memory (Direct Rambus RAM, DR RAM). It should be noted that the memory in the systems and methods described in this specification includes but is not limited to these memories and memories of any other proper types.

It should be understood that "one embodiment" or "an embodiment" mentioned in the whole specification means that particular features, structures, or characteristics related to the embodiment are included in at least one embodiment of this application. Therefore, "in one embodiment" or "in an embodiment" appearing throughout the specification does not refer to a same embodiment. In addition, these particular features, structures, or characteristics may be combined in one or more embodiments by using any appropriate manner. It should be understood that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

In addition, the terms "system" and "network" may be used interchangeably in this specification. The term "and/or" in this specification describes only an association relationship for associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that in the embodiments of this application. "B corresponding to A" indicates that B is associated with A. and B may be determined according to A. However, it should further be understood that determining A according to B does not mean that B is determined according to A only; that is, B may also be determined according to A and/or other information.

All or some of the foregoing embodiments may be implemented by using software, hardware, firmware, or any combination thereof. When software is used to implement the embodiments, the embodiments may be implemented partially in a form of a computer program product. The computer program product may include one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic disk), an optical medium (for example, a DVD), a semiconductor medium (for example, a solid-state drive (solid-state drive, SSD)), or the like.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed systems, apparatuses, and methods may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory, a random access memory, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A transmission method, comprising:
    sending, by a terminal device, a second message to a network device after receiving a first message that is sent by the network device and that instructs to activate a secondary carrier cell, wherein the second message indicates a preset time; and
    receiving, by the terminal device, a third message that is sent by the network device based on the preset time, wherein the third message instructs to trigger resynchronization of the secondary carrier cell, and wherein the preset time is a time difference between a moment at which the terminal device receives the first message and a moment at which the terminal device receives the third message.

2. The method according to claim 1, wherein the method further comprises:
    determining, by the terminal device, the preset time based on a preparation time for demodulating a physical downlink control channel (PDCCH) by the terminal device.

3. The method according to claim 2, wherein the second message is a MCE.

4. The method according to claim 1, wherein the second message is a media access control layer control element (MCE).

5. The method according to claim 1, wherein duration of the preset time is less than or equal to 30 ms.

6. A transmission method, comprising:
    receiving, by a network device after sending a first message that instructs to activate a secondary carrier cell, a second message sent by a terminal device, wherein the second message indicates a preset time; and
    sending, by the network device, a third message to the terminal device based on the preset time, wherein the third message instructs to trigger resynchronization of the secondary carrier cell, and wherein the preset time is a time difference between a moment at which the network device sends the first message and a moment at which the network device sends the third message.

7. The method according to claim 6, wherein the second message is a media access control layer control element (MCE).

8. The method according to claim 6, wherein duration of the preset time is less than or equal to 30 ms.

9. A terminal device, comprising:
    a transceiver, configured to send a second message to a network device after receiving a first message that is sent by the network device and that instructs to activate a secondary carrier cell, wherein the second message indicates a preset time;
    a non-transitory memory storage comprising instructions; and
    one or more hardware processors in communication with the non-transitory memory storage, wherein the one or more hardware processors execute the instructions to:
    receive a third message that is sent by the network device based on the preset time, wherein the third message instructs to trigger resynchronization of the secondary carrier cell, and wherein the preset time is a time difference between a moment at which the terminal device receives the first message and a moment at which the terminal device receives the third message.

10. The terminal device according to claim 9, wherein the one or more hardware processors execute the instructions to determine the preset time based on a preparation time for demodulating a physical downlink control channel (PDCCH) by the terminal device.

11. The terminal device according to claim 9, wherein the second message is a media access control layer control element (MCE).

12. The terminal device according to claim 9, wherein duration of the preset time is less than or equal to 30 ms.

* * * * *